United States Patent
Ren et al.

(10) Patent No.: US 10,814,431 B2
(45) Date of Patent: Oct. 27, 2020

(54) DEVICE FOR LASER-INDUCING CAVITATION STRENGTHENING WITH MULTI-SYSTEM AUTOMATIC COORDINATION WORK

(71) Applicant: JIANGSU UNIVERSITY, Jiangsu (CN)

(72) Inventors: Xudong Ren, Jiangsu (CN); Shouqi Yuan, Jiangsu (CN); Chengya Zuo, Jiangsu (CN); Yanqun Tong, Jiangsu (CN); Deshun Wang, Jiangsu (CN); Kun Wu, Jiangsu (CN); Jiaxing Lu, Jiangsu (CN); Hao He, Jiangsu (CN); Rui Zhou, Jiangsu (CN); Jie Wang, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 750 days.

(21) Appl. No.: 15/326,361

(22) PCT Filed: Apr. 30, 2015

(86) PCT No.: PCT/CN2015/077904
§ 371 (c)(1),
(2) Date: Jan. 13, 2017

(87) PCT Pub. No.: WO2016/155069
PCT Pub. Date: Oct. 6, 2016

(65) Prior Publication Data
US 2017/0203385 A1 Jul. 20, 2017

(30) Foreign Application Priority Data
Mar. 30, 2015 (CN) .......................... 2015 1 0141582

(51) Int. Cl.
*B23K 26/00* (2014.01)
*C21D 10/00* (2006.01)
(Continued)

(52) U.S. Cl.
CPC ........ *B23K 26/352* (2015.10); *B23K 26/1224* (2015.10); *C21D 10/005* (2013.01);
(Continued)

(58) Field of Classification Search
CPC ...... C21D 10/005; G01N 21/84; G01N 29/02; G01N 21/1717; G01N 29/2418; G01N 2291/0228; B23K 26/1224; B23K 26/352
(Continued)

(56) References Cited

U.S. PATENT DOCUMENTS 3,588,737 A * 6/1971 Chow .................... H01S 3/041
372/34
3,836,950 A * 9/1974 Bhuta ...................... G01H 9/00
73/608
(Continued)

FOREIGN PATENT DOCUMENTS

| CN | 103712723 A | 4/2014 |
|---|---|---|
| CN | 103849757 A | 6/2014 |

(Continued)

OTHER PUBLICATIONS

International Search Report issued in PCT/CN2015/077904, dated Jan. 11, 2016.
(Continued)

*Primary Examiner* — Eric S Stapleton
(74) *Attorney, Agent, or Firm* — Heslin Rothenberg Farley & Mesiti, PC

(57) ABSTRACT

A device and a method for laser-inducing cavitation strengthening with multi-system automatic coordination work. The device comprises a plurality of systems, including
(Continued)

a clamping system, a lifting system, an imaging system, a computer control system, a laser system and an energy density amplifying system, etc. The device for laser-inducing cavitation strengthening comprises a laser cavitation device and a fixing platform.

4 Claims, 2 Drawing Sheets

(51) Int. Cl.
    *G01N 21/84*     (2006.01)
    *G01N 29/02*     (2006.01)
    *B23K 26/352*     (2014.01)
    *G01N 29/24*     (2006.01)
    *G01N 21/17*     (2006.01)
    *B23K 26/12*     (2014.01)

(52) U.S. Cl.
    CPC ......... *G01N 21/1717* (2013.01); *G01N 21/84* (2013.01); *G01N 29/02* (2013.01); *G01N 29/2418* (2013.01); *G01N 2291/0228* (2013.01)

(58) Field of Classification Search
    USPC .................................................. 219/121.85
    See application file for complete search history.

(56) References Cited

U.S. PATENT DOCUMENTS

| | | | | |
|---|---|---|---|---|
| 4,492,843 A * | 1/1985 | Miller | ............... | B23K 26/123 219/121.63 |
| 4,501,949 A * | 2/1985 | Antol | ............... | B23K 26/123 219/121.63 |
| 4,541,055 A * | 9/1985 | Wolfe | ............... | B23K 26/08 700/166 |
| 4,555,610 A * | 11/1985 | Polad | ............... | B23K 26/10 219/121.61 |
| 4,876,690 A * | 10/1989 | Nishida | ............... | H01S 3/031 372/56 |
| 4,904,340 A * | 2/1990 | Miracky | ............... | C23F 1/02 156/345.15 |
| 4,986,655 A * | 1/1991 | Sweeney | ............... | G01J 3/44 356/301 |
| 4,986,656 A * | 1/1991 | Sweeney | ............... | G01J 3/44 356/301 |
| 5,012,069 A * | 4/1991 | Arai | ............... | B23K 26/0853 219/121.62 |
| 5,037,431 A * | 8/1991 | Summers | ........... | A61B 17/3203 604/22 |
| 5,053,602 A * | 10/1991 | Aharon | ............... | B23K 26/08 219/121.78 |
| 5,057,184 A * | 10/1991 | Gupta | ............... | G11B 5/3103 156/345.11 |
| 5,142,120 A * | 8/1992 | Hanson | ............... | G03F 7/70866 219/121.83 |
| 5,201,989 A * | 4/1993 | Douglas | ............... | C04B 41/009 216/87 |
| 5,238,529 A * | 8/1993 | Douglas | ............... | C04B 41/5353 216/87 |
| 5,238,530 A * | 8/1993 | Douglas | ............... | C04B 41/5353 216/62 |
| 5,279,703 A * | 1/1994 | Haberger | ........... | H01L 21/02019 216/52 |
| 5,312,516 A * | 5/1994 | Douglas | ............... | C04B 41/5353 216/87 |
| 5,374,330 A * | 12/1994 | Douglas | ............... | C04B 41/5353 216/6 |
| 5,486,264 A * | 1/1996 | Ghandour | ......... | H01L 21/76898 257/E21.597 |
| 5,504,719 A * | 4/1996 | Jacobs | ............... | G01H 9/00 367/149 |
| 5,526,110 A * | 6/1996 | Braymen | ............... | G01N 21/73 250/252.1 |
| 5,560,843 A * | 10/1996 | Koike | ................... | B23K 26/06 219/121.48 |
| 5,566,075 A * | 10/1996 | Syouji | ....................... | G03F 7/00 216/22 |
| 5,567,336 A * | 10/1996 | Tatah | ................... | C23C 14/048 156/272.8 |
| 5,593,606 A * | 1/1997 | Owen | ................... | C23C 14/046 219/121.71 |
| 5,631,425 A * | 5/1997 | Wang | ................. | G01N 29/0681 73/597 |
| 5,683,601 A * | 11/1997 | Tatah | ................... | C23C 14/048 174/250 |
| 5,749,830 A * | 5/1998 | Kaneko | .............. | A61B 1/00082 348/E5.038 |
| 5,751,416 A * | 5/1998 | Singh | ....................... | G01J 3/30 356/300 |
| 5,814,784 A * | 9/1998 | Kinsman | ............. | B23K 26/032 219/121.6 |
| 5,874,708 A * | 2/1999 | Kinsman | ............. | B23K 26/034 219/121.64 |
| 5,889,587 A * | 3/1999 | D'Silva | .................... | E21B 7/15 356/316 |
| 5,900,171 A * | 5/1999 | Karube | .............. | B23K 26/0876 219/121.79 |
| 5,910,261 A * | 6/1999 | Mori | ..................... | B23K 26/08 219/121.7 |
| 5,935,462 A * | 8/1999 | Tatah | ...................... | C23C 14/04 219/121.6 |
| 5,947,051 A * | 9/1999 | Geiger | .................. | B62D 57/00 114/222 |
| 5,956,253 A * | 9/1999 | Gottschalk | ........... | G01B 11/005 33/503 |
| 5,982,535 A * | 11/1999 | Inoue | ..................... | G02B 21/26 359/368 |
| 6,029,912 A * | 2/2000 | Woolley | ................... | B05B 1/26 239/428.5 |
| 6,037,564 A * | 3/2000 | Tatah | .................... | B23K 26/067 219/121.7 |
| 6,041,020 A * | 3/2000 | Caron | ..................... | G01H 9/008 356/340 |
| 6,043,452 A * | 3/2000 | Bestenlehrer | ........ | B23K 26/032 219/121.62 |
| 6,060,127 A * | 5/2000 | Tatah | ................... | C23C 14/048 257/E21.295 |
| 6,144,007 A * | 11/2000 | Levin | .................... | B23K 26/04 219/121.62 |
| 6,163,012 A * | 12/2000 | Kimura | ................ | B23K 26/106 219/121.78 |
| 6,180,912 B1 * | 1/2001 | Tatah | .................... | B23K 26/067 219/121.6 |
| 6,211,080 B1 * | 4/2001 | Tatah | .................... | C23C 14/046 438/662 |
| 6,232,738 B1 * | 5/2001 | Sawada | .................. | B23Q 1/032 264/1.34 |
| 6,284,999 B1 * | 9/2001 | Virtanen | ............. | B23K 26/046 219/121.67 |
| 6,295,719 B1 * | 10/2001 | Strom | .................... | G11B 5/4826 219/121.85 |
| 6,300,592 B1 * | 10/2001 | Ulrich | ................... | B23K 26/06 219/121.67 |
| 6,326,586 B1 * | 12/2001 | Heyerick | ............. | B23K 26/046 219/121.67 |
| 6,376,798 B1 * | 4/2002 | Remue | ................. | B23K 26/046 219/121.67 |
| 6,430,465 B2 * | 8/2002 | Cutler | .................... | B23K 26/04 318/568.17 |
| 6,487,229 B2 * | 11/2002 | Govorkov | ............ | B23K 26/12 372/57 |
| 6,566,626 B2 * | 5/2003 | Gaissinsky | ............ | B44B 7/007 219/121.69 |
| 6,583,383 B2 * | 6/2003 | Higashi | .................. | B23K 26/18 219/121.67 |
| 6,588,738 B1 * | 7/2003 | Sukuvaara | ............ | B23K 26/06 269/293 |

(56) References Cited

U.S. PATENT DOCUMENTS

| | | | | |
|---|---|---|---|---|
| 6,621,838 B2* | 9/2003 | Naito | A61F 9/00821 | 372/34 |
| 6,622,058 B1* | 9/2003 | Picard | B23K 10/00 | 219/121.55 |
| 6,653,971 B1* | 11/2003 | Guice | A01M 1/026 | 342/22 |
| 6,667,796 B1* | 12/2003 | Nishi | G03F 7/2006 | 355/30 |
| 6,720,522 B2* | 4/2004 | Ikegami | B23K 26/0732 | 219/121.69 |
| 6,730,447 B2* | 5/2004 | Ito | B23K 26/04 | 430/22 |
| 6,731,570 B1* | 5/2004 | Langdon | G01H 9/002 | 356/450 |
| 6,746,967 B2* | 6/2004 | Brask | C23F 1/02 | 134/10 |
| 6,770,568 B2* | 8/2004 | Brask | H01L 21/32134 | 257/E21.309 |
| 6,772,040 B1* | 8/2004 | Picard | B23K 10/006 | 219/121.11 |
| 6,777,642 B2* | 8/2004 | Song | B08B 7/0042 | 219/121.68 |
| 6,795,456 B2* | 9/2004 | Scaggs | G01N 21/718 | 372/23 |
| 6,835,319 B2* | 12/2004 | Song | C03C 17/23 | 216/101 |
| 6,862,936 B2* | 3/2005 | Kenderian | G01M 17/10 | 73/636 |
| 6,869,889 B1* | 3/2005 | Brask | H01L 21/32134 | 216/100 |
| 6,870,130 B2* | 3/2005 | Yamazaki | B23K 26/0853 | 219/121.83 |
| 6,932,914 B2* | 8/2005 | LeClair | A61B 18/26 | 216/52 |
| 6,940,037 B1* | 9/2005 | Kovacevic | B23K 9/044 | 219/121.64 |
| 6,945,114 B2* | 9/2005 | Kenderian | G01N 29/12 | 73/643 |
| 6,960,307 B2* | 11/2005 | LeClair | A61B 18/26 | 216/52 |
| 6,995,334 B1* | 2/2006 | Kovacevic | B23K 26/032 | 219/121.63 |
| 7,020,539 B1* | 3/2006 | Kovacevic | B22F 3/1055 | 700/166 |
| 7,045,738 B1* | 5/2006 | Kovacevic | B05B 7/144 | 219/121.63 |
| 7,100,846 B2* | 9/2006 | Pein | A61B 17/3203 | 219/121.84 |
| 7,356,240 B2* | 4/2008 | Adachi | B23K 26/38 | 385/147 |
| 7,532,652 B2* | 5/2009 | Vetrovec | F41H 13/005 | 372/34 |
| 7,557,917 B1* | 7/2009 | Beesley | G01N 21/718 | 356/30 |
| 7,605,063 B2* | 10/2009 | Chebi | H01J 37/321 | 156/345.41 |
| 7,757,561 B2* | 7/2010 | Laugharn, Jr. | B01F 11/0283 | 366/127 |
| 7,969,570 B2* | 6/2011 | Ebstein | B01L 3/5088 | 356/301 |
| 8,016,940 B2* | 9/2011 | Adachi | B23K 26/03 | 117/8 |
| 8,101,921 B2* | 1/2012 | Oshemkov | A61B 18/26 | 137/13 |
| 8,115,936 B2* | 2/2012 | Ochiai | F22B 37/003 | 356/237.2 |
| 8,125,704 B2* | 2/2012 | Mielke | H01S 3/0057 | 359/341.1 |
| 8,139,910 B2* | 3/2012 | Stadler | H01S 3/0057 | 359/572 |
| 8,184,284 B2* | 5/2012 | Ebstein | B01L 3/502753 | 356/301 |
| 8,189,971 B1* | 5/2012 | Vaissie | H01S 3/0057 | 359/333 |
| 8,288,680 B1* | 10/2012 | Burrowes | B29B 17/02 | 156/753 |
| 8,398,622 B2* | 3/2013 | Stoltz | A61B 18/20 | 606/10 |
| 8,449,787 B2* | 5/2013 | Imada | H01L 21/31111 | 216/83 |
| 8,458,871 B2* | 6/2013 | Messina | B23K 26/38 | 29/26 A |
| 8,496,799 B2* | 7/2013 | Von Gutfeld | C25D 5/50 | 205/80 |
| 8,507,828 B2* | 8/2013 | Krause | H01L 31/022433 | 219/121.69 |
| 8,529,738 B2* | 9/2013 | Von Gutfeld | C25D 5/022 | 204/242 |
| 8,619,357 B2* | 12/2013 | Gaudiosi | H01S 3/2308 | 359/333 |
| 8,628,831 B2* | 1/2014 | Tang | C23C 18/1608 | 427/301 |
| 8,929,406 B2* | 1/2015 | Chuang | G01N 21/84 | 372/5 |
| 8,985,050 B2* | 3/2015 | Von Gutfeld | C25D 5/34 | 118/620 |
| 9,022,037 B2* | 5/2015 | Delfyett | A61B 18/20 | 128/898 |
| 9,042,006 B2* | 5/2015 | Armstrong | H01S 3/2316 | 359/341.1 |
| 9,089,928 B2* | 7/2015 | Zediker | E21B 29/02 | |
| 9,102,008 B2* | 8/2015 | Haight | B23K 26/032 | |
| 9,144,882 B2* | 9/2015 | Lindsay | B23K 5/00 | |
| 9,395,715 B2* | 7/2016 | Brandt | B23K 5/00 | |
| 9,436,012 B2* | 9/2016 | Dvorkin | B23K 26/067 | |
| 9,452,495 B1* | 9/2016 | Hashimoto | B23K 26/38 | |
| 9,529,182 B2* | 12/2016 | Chuang | H01S 3/005 | |
| 9,583,225 B2* | 2/2017 | Uehara | B23K 26/128 | |
| 9,608,399 B2* | 3/2017 | Chuang | G02F 1/353 | |
| 9,643,273 B2* | 5/2017 | Adams | B23K 9/013 | |
| 9,804,101 B2* | 10/2017 | Deng | G01N 21/9501 | |
| 10,329,641 B2* | 6/2019 | Nomura | B23K 26/0622 | |
| 2001/0018312 A1* | 8/2001 | Gottschalk | B24B 9/148 | 451/5 |
| 2002/0122525 A1* | 9/2002 | Rosenberger | G21F 9/04 | 376/272 |
| 2002/0148820 A1* | 10/2002 | Tomlinson | B23Q 3/18 | 219/121.82 |
| 2003/0034093 A1* | 2/2003 | Morris | B23K 26/0736 | 148/197 |
| 2003/0192865 A1* | 10/2003 | Cole, III | B23K 26/04 | 219/121.67 |
| 2003/0204283 A1* | 10/2003 | Picard | B23K 10/00 | 700/166 |
| 2003/0222065 A1* | 12/2003 | Leibinger | B23K 26/0884 | 219/121.79 |
| 2004/0004055 A1* | 1/2004 | Barros | A61B 18/26 | 216/13 |
| 2004/0040379 A1* | 3/2004 | O'Donnell | A61B 5/0095 | 73/627 |
| 2004/0262274 A1* | 12/2004 | Patel | B23K 26/032 | 219/121.68 |
| 2005/0003737 A1* | 1/2005 | Montierth | A61B 8/546 | 451/5 |
| 2005/0040146 A1* | 2/2005 | Takami | B23K 26/03 | 219/121.63 |
| 2005/0064137 A1* | 3/2005 | Hunt | B23K 26/06 | 428/131 |
| 2005/0123445 A1* | 6/2005 | Blecka | G01N 35/0099 | 422/64 |
| 2005/0199596 A1* | 9/2005 | Takami | H01L 22/12 | 219/121.65 |
| 2005/0220675 A1* | 10/2005 | Reed | B01L 3/50851 | 422/400 |
| 2005/0221358 A1* | 10/2005 | Carrillo | B01L 3/5027 | 435/6.16 |
| 2005/0225751 A1* | 10/2005 | Sandell | B01L 3/5027 | 356/236 |

(56) References Cited

U.S. PATENT DOCUMENTS

| | | | |
|---|---|---|---|
| 2005/0226771 A1* | 10/2005 | Lehto | B01L 3/5027 422/63 |
| 2005/0226779 A1* | 10/2005 | Oldham | B01L 3/5027 422/400 |
| 2005/0226780 A1* | 10/2005 | Sandell | B01L 3/5027 422/400 |
| 2005/0226782 A1* | 10/2005 | Reed | B01L 3/50851 422/400 |
| 2005/0231723 A1* | 10/2005 | Blasenheim | B01L 3/5027 356/414 |
| 2005/0232818 A1* | 10/2005 | Sandell | B01L 3/5027 422/400 |
| 2005/0232820 A1* | 10/2005 | Reed | B01L 3/50851 422/552 |
| 2005/0232821 A1* | 10/2005 | Carrillo | B01L 3/50851 422/400 |
| 2005/0232822 A1* | 10/2005 | Reed | B01L 3/50851 422/552 |
| 2005/0233363 A1* | 10/2005 | Harding | B01L 3/50851 435/6.16 |
| 2005/0233472 A1* | 10/2005 | Kao | B01L 3/5025 436/180 |
| 2005/0237528 A1* | 10/2005 | Oldham | B01L 3/5027 356/414 |
| 2005/0244932 A1* | 11/2005 | Harding | B01L 3/5027 435/91.1 |
| 2005/0263505 A1* | 12/2005 | Yamazaki | B23K 26/0093 219/121.78 |
| 2005/0280811 A1* | 12/2005 | Sandell | B01L 3/5027 356/246 |
| 2006/0011305 A1* | 1/2006 | Sandell | B01L 3/5025 156/542 |
| 2006/0013984 A1* | 1/2006 | Sandell | B01L 3/5025 428/40.1 |
| 2006/0024690 A1* | 2/2006 | Kao | B01L 3/50851 435/6.11 |
| 2006/0024831 A1* | 2/2006 | Kao | B01L 3/5025 356/243.1 |
| 2006/0029525 A1* | 2/2006 | Laugharn, Jr. | B01F 11/02 422/130 |
| 2006/0029948 A1* | 2/2006 | Lim | B01L 3/50853 435/6.19 |
| 2006/0078012 A1* | 4/2006 | Miwa | G02B 3/06 372/22 |
| 2006/0171656 A1* | 8/2006 | Adachi | B23K 26/38 385/147 |
| 2007/0014694 A1* | 1/2007 | Beard | B01L 3/5025 422/400 |
| 2007/0015289 A1* | 1/2007 | Kao | B01L 3/0268 436/180 |
| 2007/0053795 A1* | 3/2007 | Laugharn, Jr. | B01F 11/0283 73/644 |
| 2007/0076077 A1* | 4/2007 | Miura | B41J 3/407 347/102 |
| 2007/0157730 A1* | 7/2007 | Ochiai | F22B 37/003 73/627 |
| 2007/0278719 A1* | 12/2007 | Adachi | B23K 26/03 264/400 |
| 2008/0110011 A1* | 5/2008 | Reed | C23C 14/3414 29/563 |
| 2008/0230717 A1* | 9/2008 | Ashkenazi | G01N 21/1702 250/459.1 |
| 2009/0068062 A1* | 3/2009 | Jafari | G01N 1/38 422/64 |
| 2009/0130016 A1* | 5/2009 | Mills | C01B 3/02 423/395 |
| 2009/0142257 A1* | 6/2009 | Mills | C01B 3/00 423/645 |
| 2009/0240368 A1* | 9/2009 | Young, Jr. | B23K 31/10 700/166 |
| 2010/0031487 A1* | 2/2010 | Messina | B23K 26/38 29/26 A |
| 2010/0035371 A1* | 2/2010 | Yamazaki | C23C 14/048 438/29 |
| 2010/0108648 A1* | 5/2010 | Koseki | B23K 26/0604 219/121.67 |
| 2010/0268042 A1* | 10/2010 | Wang | A61B 5/0068 600/322 |
| 2011/0036991 A1* | 2/2011 | Oshemkov | G02B 21/32 250/432 R |
| 2011/0048135 A1* | 3/2011 | Caron | G01N 29/2418 73/633 |
| 2011/0095198 A1* | 4/2011 | Smiljanic | B22F 3/105 250/396 R |
| 2012/0044488 A1* | 2/2012 | Senac | G01J 3/02 356/316 |
| 2012/0097653 A1* | 4/2012 | Yabe | C01B 33/023 219/121.85 |
| 2012/0113430 A1* | 5/2012 | Liu | G01N 29/0654 356/456 |
| 2012/0118052 A1* | 5/2012 | O'Donnell | G01N 29/222 73/64.53 |
| 2012/0205349 A1* | 8/2012 | Uehara | B23K 26/128 219/121.61 |
| 2012/0320368 A1* | 12/2012 | Jiao | G01N 29/0681 356/72 |
| 2013/0062323 A1* | 3/2013 | Hassan | G01N 21/718 219/121.62 |
| 2013/0160557 A1* | 6/2013 | Nakajima | G01H 9/00 73/655 |
| 2013/0180969 A1* | 7/2013 | Cheng | B23K 26/356 219/121.85 |
| 2013/0259903 A1* | 10/2013 | Mortenson | A61K 47/02 424/400 |
| 2014/0033821 A1* | 2/2014 | Sun | G01N 29/2418 73/627 |
| 2015/0269603 A1* | 9/2015 | Young, Jr. | H04W 4/21 705/14.27 |
| 2015/0332071 A1* | 11/2015 | Hoffa | B24C 1/045 340/10.2 |
| 2015/0355444 A1* | 12/2015 | Jiang | G02B 21/0028 359/385 |
| 2015/0371129 A1* | 12/2015 | Hoffa | B23K 5/00 340/10.2 |
| 2016/0059363 A1* | 3/2016 | Ardisson | B23K 37/0288 219/121.39 |
| 2016/0221108 A1* | 8/2016 | Hoffa | B23K 10/006 |
| 2017/0203385 A1* | 7/2017 | Ren | C21D 10/005 |

FOREIGN PATENT DOCUMENTS

| | | |
|---|---|---|
| CN | 103920884 A | 7/2014 |
| CN | 104561516 A | 4/2015 |

OTHER PUBLICATIONS

Xie et al., "New progress in research and application of laser induced cavitation," Chinese Journal of Lasers, vol. 2013, No. 8 (2013).

* cited by examiner

DEVICE FOR LASER-INDUCING CAVITATION STRENGTHENING WITH MULTI-SYSTEM AUTOMATIC COORDINATION WORK

CROSS REFERENCE TO RELATED APPLICATIONS

This application is the National Phase filing under 35 U.S.C. § 371 of International Application No. PCT/CN2015/077904, filed on Apr. 30, 2015, and published on Oct. 6, 2016, as WO/2016/155069 A1, and claims priority to Chinese Application No. 201510141582.X, filed on Mar. 30, 2015. The contents of each of the prior applications are hereby incorporated by reference herein in their entirety.

FIELD OF THE INVENTION

This invention relates a multi-system automatic coordinating apparatus and method for laser induced cavitation strengthening. It employs nanosecond laser to induce cavitation bubbles. The bubbles can change the distribution of residual stress on target surface.

BACKGROUND OF THE INVENTION

With irradiation of nanosecond laser, liquid can be broken down when the laser energy density beyond the breakdown threshold. The high-temperature high-density plasma would be induced in the breakdown zone. The plasma expands and induces ultrasonic shock wave. Meanwhile, the bubbles are induced. This is called laser cavitation. Laser cavitation is a powerful tool to study the cavitation phenomenon, which is helpful to carry out the research of underwater shock processing, underwater drilling, cavitation erosion and so on.

Early in 1753, Euler noticed that when the pressure in the water pipe is reduced to the vapor pressure or even negative value, the water is separated from the pipe wall and a vacuum space is formed. This phenomenon is called cavitation. After that, it is found that the cavitation can happen in the flowing liquid and hydraulic machinery, in which the liquid flow to the pump, turbine, or propeller of ships. Cavitation phenomenon is unique to the high speed movement of liquid. Its generation and development depend on many complicated factors. On one hand, the cavitation phenomenon has a serious impact on hydraulic machinery and flow characteristic of liquid, such as erosion of hydraulic machinery blade, damage of organs during blood flow. On the other hand, the cavitation phenomenon can be helpful to life and production, such as reduction of water pollution, improve efficiency of ophthalmic surgery and under water drilling. For decades, cavitation phenomenon and use of it to serve the life and production have been one of the hot issues of researchers.

After reviewing the literature, it is found the water tank cannot be changed easily and it is not fixed in the current equipment. The current equipment is not controlled by computer and the sub-system is not automatic, which limit the continuity, accuracy, and effectiveness of the experiments. Due to this, we designed the above apparatus.

SUMMARY OF THE INVENTION

The current invention is aimed to provide a new apparatus and method for laser cavitation strengthening, which can be beneficial for studying the cavitation strengthening mechanism and provide equipment support for its industrialization.

In order to achieve the above purpose, the invention is employing an automatic coordinating multi-system to improve the effect of laser cavitation strengthening. It includes device of laser cavitation and the fixing station. There is a water tank on the fixing station and a cushion block is provided in the water tank. A temperature sensor is mounted on the wall of the water tank and connected to a computer. The fixing station is located on the lifting device and the lifting device is mounted on the two-axis platform. The laser emitted from the laser cavitation device passes through the side wall of the water tank and focuses in the tank. The laser cavitation device is connected to the computer and the lifting device and corresponding two-axis platform are connected to the computer thought CNC servo system.

A guide rod is arranged at the upper end of the fixing station and a movable plate is mounted on the guide rod. The movable plate is connected to both the moving pair of the guide rod and the piston rod of a cylinder. The cylinder is connected to a nitrogen tank through an electromagnetic valve.

The lifting device includes a lifting platform and the fixing station is positioned on the lifting platform. The lifting platform is connected with the CNC servo system through a shaft, a coupling, and a servo motor in turn.

The laser cavitation device is consist of laser controller, YAG laser, 45° mirror, beam expanding lens, and focusing lens. The laser emits from the YAG laser under control of laser controller and focuses in the water tank after passing the 45° mirror, beam expanding lens, focusing lens, and side wall of the water tank.

The apparatus also has an imaging system. The system includes a lighting flash, a high speed camera, and a CCD. The above lighting flash, high speed camera, and CCD are all connected to the computer. It is used for recording the pulsating and collapse of the cavitation bubbles.

There is a hydrophone above the water tank which is connected to computer.

The current invention also provides a using method for the above apparatus which includes the following steps:

S1 The surface of target and cushion block is wiped with ethanol or acetone to remove the oil and ash layer, which can prevent influencing the accuracy of experiments. The target and cushion block are put into the water tank. The water tank is then put on the fixing station. The purified water is filled into the tank to submerge the target and cushion block.

S2 The water tank is fixed by the system composed of cylinder, movable plate, guide rode, nitrogen tank, and electromagnetic valve. The electromagnetic valve is controlled by computer.

S3 Laser is emitted from YAG laser under control of laser controller. The laser beam passes the energy density adjusting system composed of 45° mirror, beam expanding lens, and focusing lens.

S4 The computer controls the CNC servo system to lift the water tank through the lifting system which is composed of lifting platform, coupling, servo motor, and shaft. The lifting platform is moved by a gear rack mechanism. The lifting distance can be calculated according to the known gear rack ratio and the revolution of the servo motor. The number will be displayed on the screen of computer which can avoid error brought by people's reading. At the same time, temperature sensor is telling the computer the water temperature in real time and the number will be displayed on the computer screen.

S5 The effect of laser cavitation strengthening can be determined by analyzing the distribution of residual stress after cleaning the target surface.

S6 Adjust the lifting system, change the water temperature, and repeat the above steps until the optimized distribution of residual stress induced by laser cavitation strengthening is obtained. Then the water temperature and strengthening distance (ds) are determined for the above optimized distribution of residual stress. ds is the distance between target surface and the laser focus point.

S7 Keep the above ds and water temperature unchanged, process the whole target surface by moving the platform under control of computer.

The apparatus can also monitor the laser cavitation strengthening process. The imaging system composed of high speed camera and CCD is connected to computer. The computer controls the switch of the lighting flash and receives the acoustic signal provided by the hydrophone and the signal of imaging system in real time. By studying the acoustic and imaging signal, it can provide data for studying the water temperature and ds for the optimal residual stress distribution.

The advantage of the current invention lies in: (1) the cylinder can fix water tanks with different size which is helpful for different situation; (2) the lifting system with gear rack mechanism can be controlled numerically and accurately, which can avoid the use of expensive systems such as five-axis linkage sets and CNC operation platform. It is convenient and saving the cost; (3) all the systems are connected to the computer and can be controlled automatically to ensure the continuity, accuracy, and convenience of the experiments; (4) the current strengthening method has no pollution and high utilization rate compared to the traditional methods. It can be used for industrialization.

DETAILED DESCRIPTION OF THE EMBODIMENTS

Figure 1:
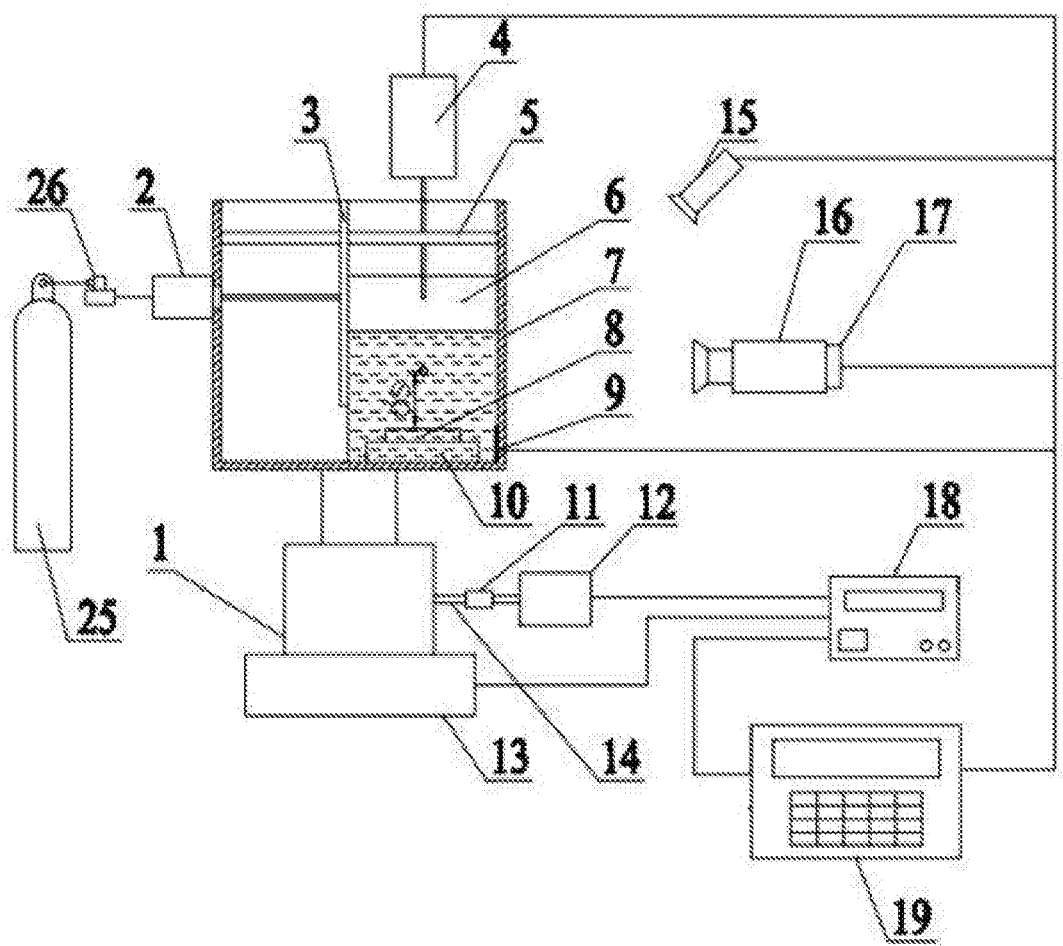
FIG. 1 is the main view of the apparatus.
Figure 2:
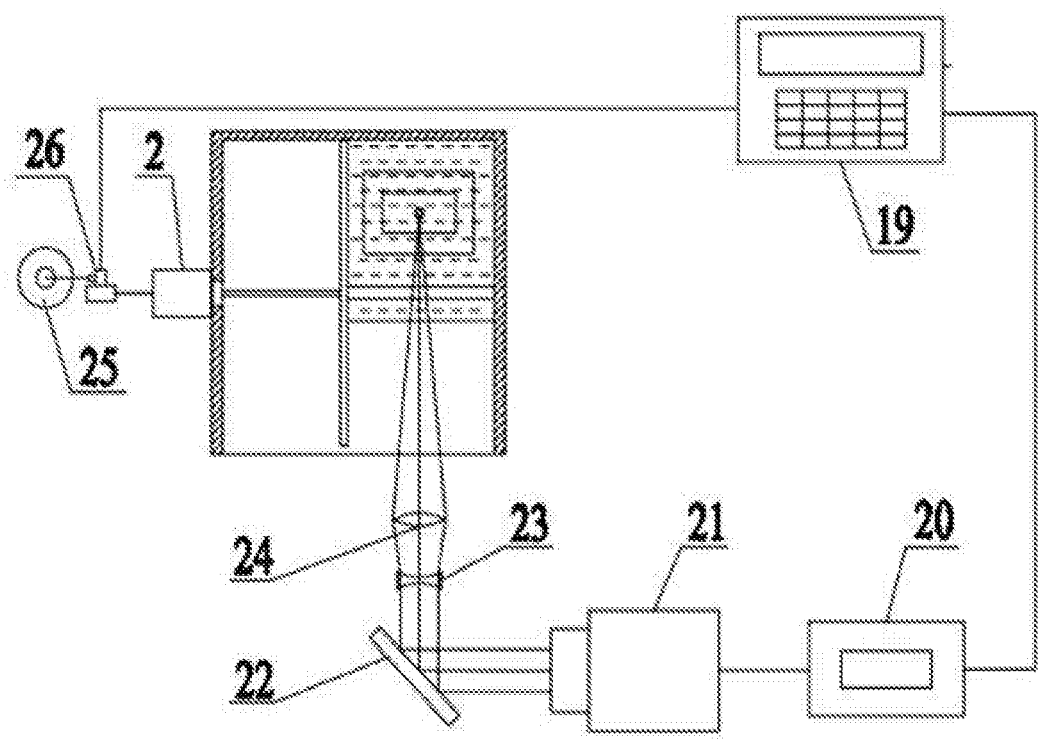
FIG. 2 is the top view of the apparatus.
In the drawings: (1) lifting platform, (2) cylinder, (3) movable plate, (4) hydrophone, (5) guide rod, (6) water tank, (7) fixing station, (8) target, (9) temperature sensor, (10) cushion block, (11) coupling, (12) servo motor, (13) two-axis platform, (14) shaft, (15) lighting flash, (16) high speed camera, (17) CCD, (18) CNC servo system, (19) computer, (20) laser controller, (21) YAG laser, (22) 45° mirror, (23) beam expanding lens, (24) focusing lens, (25) nitrogen tank, (26) electromagnetic valve.

As shown in FIGS. 1 and 2, the above apparatus includes laser cavitation device and fixing station (7). The laser cavitation device includes laser controller (20), YAG laser (21), 45° mirror (22), beam expanding lens (23), focusing lens (24). The laser controller (20) controls YAG laser (21) to emit laser. The laser beam passes the 45° mirror (22), beam expanding lens (23), focusing lens (24), and side wall of water tank (6) to focus in the water tank (6). The water tank (6) is on the fixing station (7) and a cushion block (10) is put in the water tank (6). A guide rod (5) is mounted on the upper end of the fixing station (7) and a movable plate (3) is mounted on the guide rod (5). The movable plate (3) is connected to the moving pair of guide rod (5) and the piston rod of the cylinder (2). The cylinder (2) is connected to nitrogen tank (25) though electromagnetic valve (26).

There is a temperature sensor (9) on the side wall of water tank (6). The temperature sensor (9) is connected to computer (19). Above the water tank (6), there is a hydrophone (4) connected to computer (19), which is used for recording acoustic signal of cavitation. The imaging system includes flash light (15), high speed camera (16), and CCD (17). The flash light (15), high speed camera (16), and CCD (17) are all connected to computer (19) to record the pulsating and collapse of the cavitation bubbles. The fixing station (7) is on the lifting system. The lifting system includes lifting platform (1) and the fixing station (7) is on the lifting platform (1). The lifting platform is connected to CNC servo system (18) through shaft (14), coupling (11), and servo motor (12). The lifting system is on the two-axis platform (13). The laser beam emitted from laser cavitation device is focused in water tank (6) after passing through the side wall of it. The above device is connected to computer (19). The above lifting system and two-axis platform (13) are connected to computer (19) through CNC servo system (18).

During the operation, the target (8) and cushion block (10) are cleaned with ethanol or acetone and put into the right place of water tank (6). The water tank is put on the fixing station (7) and the purified water is filled into the water tank until the target (8) and cushion block (10) are submerged. The water temperature obtained from temperature sensor (9) during laser cavitation can be seen on computer screen in real time. Computer (19) is controlling the fixing system and lifting system. The YAG laser (21) emits laser after the laser parameters (laser energy, laser wavelength, beam spot size) are set on laser controller (20). The cavitation is generated after amplifying the laser energy. The experiment data are analyzed and the residual stress distribution is measured after cleaning the target (8) surface. Adjust the lifting system and change the water temperature to repeat the above operation until the optimal strengthening distance ds is obtained (ds is the distance between target (8) surface and laser focus point in the water tank (6)). Keep the ds unchanged and process the whole target (8) surface with control of two-axis platform (13) by computer (19). In order for further study of the laser cavitation process with optimal situation, the hydrophone and imaging system send signals to computer (19) so that the researchers can make observation and research to cavitation process in details.

It should be noticed that the above content is only illustrating the technical scheme rather than limit the scope of protection of the current invention. The simple modification or equivalent replacement of the technical scheme made by technicians in this field does not separate from the nature and extent of the technical scheme of this invention.

The invention claimed is:

1. A multi-system automatic coordinating apparatus for laser induced cavitation strengthening, comprising:
    a laser cavitation device and a fixing station, wherein the fixing station has a water tank with a cushion block inside, a temperature sensor on a side wall of the water tank, and the temperature sensor is connected to a computer; and wherein the fixing station is on a lifting system and the lifting system is on a two-axis platform,
    a laser emitted from the laser cavitation device passes through a wall of the water tank and focuses in the tank,
    and further comprising a guide rod at the upper end of the fixing station and a movable plate mounted on the guide rod, wherein the movable plate is connected with the guide rod in the form of a moving pair, the movable plate is connected to a piston rod of a cylinder, and the cylinder is connected to a nitrogen tank through an electromagnetic valve;

and wherein the laser cavitation device is connected to the computer, and the lifting system and two-axis platform are both connected to the computer through a CNC servo system.

2. The multi-system automatic coordinating apparatus for laser induced cavitation strengthening according to claim 1, wherein the lifting system has a lifting platform, the fixing station is on the lifting platform and the lifting platform is connected to the CNC servo system through a shaft, a coupling, and a servo motor in turn.

3. The multi-system automatic coordinating apparatus for laser induced cavitation strengthening according to claim 1, wherein: the laser cavitation device includes a laser controller, a YAG laser, a 45° mirror, a beam expanding lens, and a focusing lens, and wherein the laser controller controls the YAG laser to emit the laser, and the laser focuses in the water tank after passing the 45° mirror, the beam expanding lens, the focusing lens, and the back side wall of water tank.

4. The multi-system automatic coordinating apparatus for laser induced cavitation strengthening according to claim 3, further comprising a hydrophone above the water tank, wherein the hydrophone is connected to the computer.

* * * * *